United States Patent [19]

Jaszczak

[11] Patent Number: 4,499,375
[45] Date of Patent: Feb. 12, 1985

[54] NUCLEAR IMAGING PHANTOM

[76] Inventor: Ronald J. Jaszczak, 2307 Honeysuckle Rd., Chapel Hill, N.C. 27514

[21] Appl. No.: 376,775

[22] Filed: May 10, 1982

[51] Int. Cl.³ .................. G01D 18/00; G12B 13/00
[52] U.S. Cl. ............................................. 250/252.1
[58] Field of Search .................. 250/252.1, 505.1; 378/18, 207

[56] References Cited

U.S. PATENT DOCUMENTS 3,955,088  5/1976  Muehllehner et al. .......... 250/363 S
4,057,726  11/1977  Jaszczak ........................ 250/363 S

OTHER PUBLICATIONS

Stephen E. Derenzo, Thomas F. Budinger, Ronald H. Huesman, John L. Cahoon and Tony Vuletieh, "Imaging Properties of a Positron Tomograph with 280 BGO Crystals" *IEEE Transactions on Nuclear Science*, vol. NS-28, No. 1, (Feb. 1981), pp. 81–89.
Ronald J. Jaszczak, Lee-Tzuu Chang, Neil A. Stein and Fergus E. Moore, "Whole-Body Single-Photon Emission Computed Tomography Using Dual, Large-Field-of-View Scintillation Cameras", *Phys. Med. Biol.*, vol. 24, No. 6, (1979), pp. 1123–1143.
Article by Ronald J. Jaszczak et al., "Selected Processing Techniques for Scintillation Camera Based SPECT Systems", in *Single Photon Emission Computed Tomography . . .*, publ. by The Society of Nuclear Medicine, pp. 45 & 54–57.
Advertisement Circle No. 690 on p. 36 of *RNM Images*, Apr. 1982.
Article by Ronald J. Jaszczak et al., "SPECT: Single Photon Emission Computed Tomography", IEEE Transactions on Nuclear Science, vol. NS-27, No. 3, Jun. 1980. pp. 1137 & 1142–1148.
Article by Ronald J. Jaszczak et al., "Radionuclide Emission Computed Tomography of the Head with ⁹⁹ᵐTc and a Scintillation Camera" in Journal of Nuclear Medicine, vol. 18, No. 4, pp. 373 & 376–379.
Article by Ronald J. Jaszczak et al., "Physical Factors Affecting Quantitative Measurements Using Camera-Based Photon Emission Computed Tomography (SPECT)", in IEEE Transactions on Nuclear Science, vol. NS-28, No. 1, Feb. 1981, pp. 69, 76 & 77.
Cat Phan:Mark 1, Section 4, Alderson Research Laboratories, Inc., 5 page brochure.
Atomlab Catalog No. 35, Atomic Products Corporation, cover & pp. 9–16.
Supplement to Catalog M-1, "Nuclear Medicine Instruments & Accessories," Nuclear Associates, 1982, pp. 6 & 7.
Book Chapter No. 1, Single-Photon Transverse Section Devices, by Ronald J. Jaszczak et al., pp. 2, 7 & FIG. 10.

*Primary Examiner*—Janice A. Howell
*Assistant Examiner*—Constantine Hannaher
*Attorney, Agent, or Firm*—Charles H. Thomas

[57] ABSTRACT

A phantom for testing nuclear imaging instruments, such as are used in nuclear medicine, includes a hollow, cylindrical case with a removable carrier. The carrier contains several sets of straight, parallel rods which are of uniform cross section throughout and which have equal orthogonal dimensions in a plane perpendicular to rod alignment. The rods are arranged in an array with uniform spacing therebetween in each set. Several spheres are mounted on posts which screw into the base of the case so that the spheres are oriented in a plane perpendicular to the rod alignment. A pair of capillary tubes are secured to closure caps which are threadably engageable in access openings in the top of the case. The capillary tubes are insertable into circular, laterally stabilizing wells in the bottom of the case.

6 Claims, 9 Drawing Figures

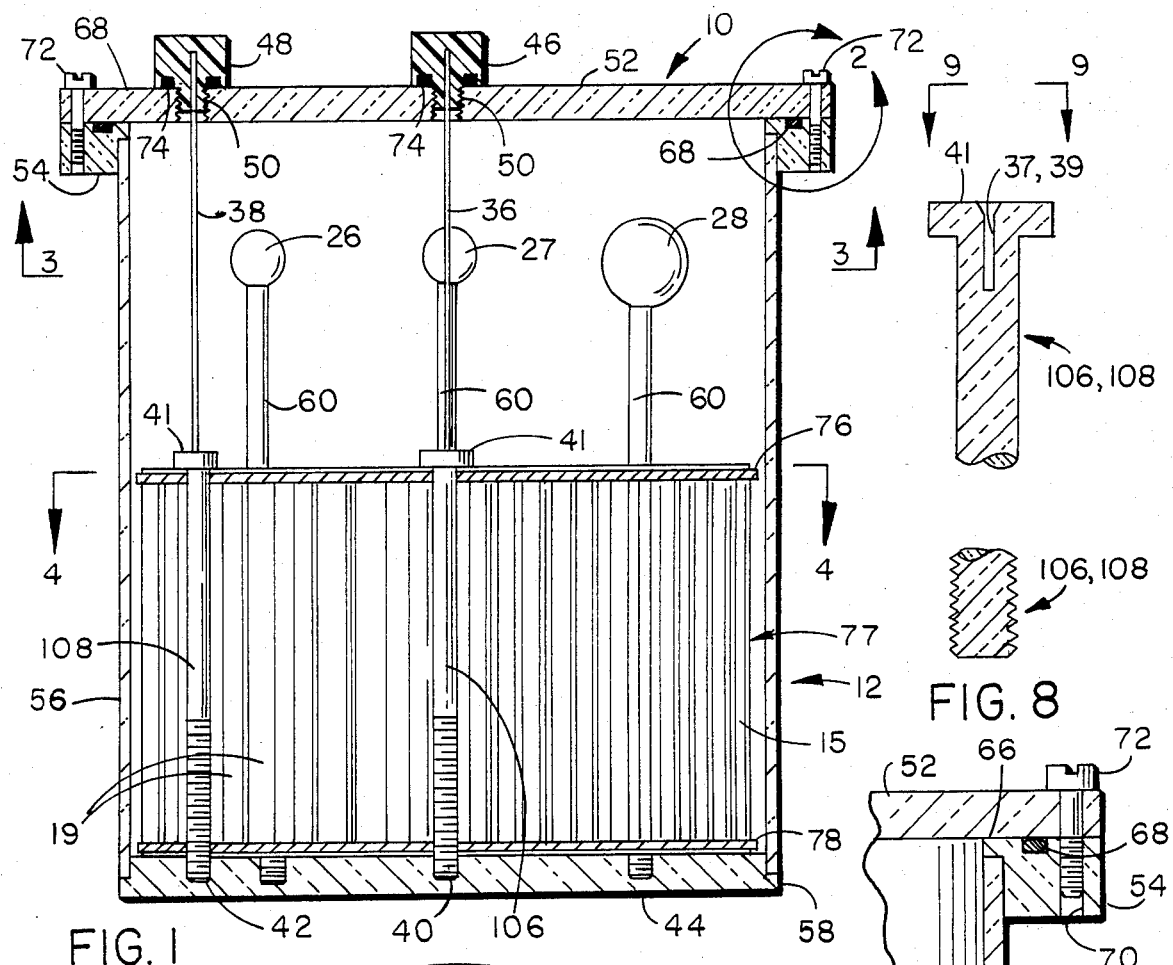
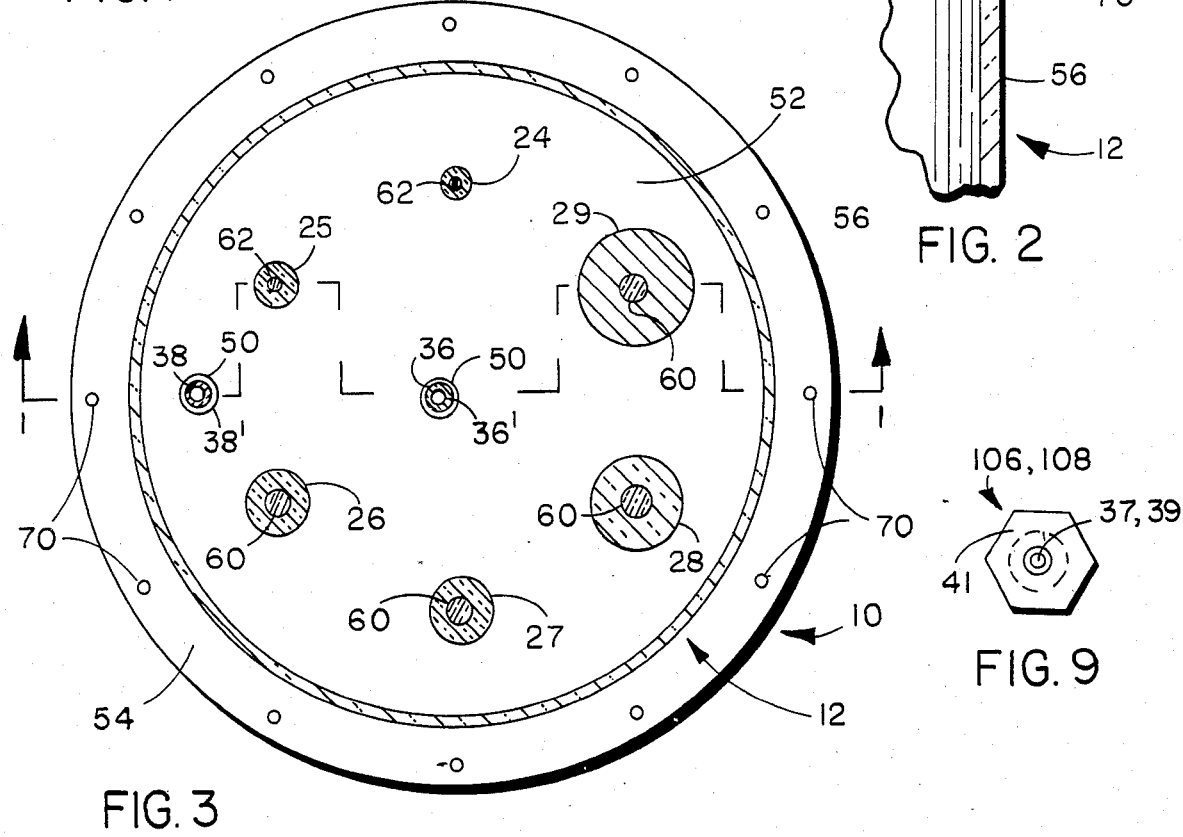

4,499,375

NUCLEAR IMAGING PHANTOM

BACKGROUND OF THE INVENTION

1. Field of the Invention

The present invention relates to testing devices for use in measuring the accuracy of nuclear imaging instruments, especially instruments used for diagnostic purposes in nuclear medicine.

2. Description of the Prior Art

A number of different nuclear imaging instruments have been devised for diagnosing patient ailments and conditions. The field of use of such instruments is known as the field of nuclear medicine. Nuclear imaging instruments are advantageous in that they can produce images of circulatory conditions within soft tissue organs of a patient's body without exploratory surgery.

In the practice of nuclear medicine, a low level dosage of a tracer radioisotope, such as technitium-99 m is injected into a patient. The tracer radioisotope is carried in the patient's blood stream to the patient's internal organs, such as the heart, liver, kidneys, etc. The tracer radioisotope emits gamma rays, a portion of which pass from the patient's body and are detectable by nuclear imaging instruments.

There are several types of nuclear imaging instruments. A relatively simple nuclear imaging instrument is known as a scanner. A scanner is equipped with a gamma ray detector, such as a sodium iodide NaI(Tl) scintillation crystal. The gamma ray detector responds to an incident gamma ray by emitting a flash of light. A photodetector, such as a photomultiplier tube, is positioned to continuously view the sodium iodide crystal, and to emit a voltage pulse as gamma rays are detected. The scanner is moved in a raster pattern outside of a patient's body adjacent to the patient's organ of interest. A record of the voltage pulses from the photomultiplier tube is kept, thereby creating a "map" or image of the location at which gamma radiation was detected. An unusually high concentration of radiation indicates an internal lesion in the organ scanned, while an unusual absence of radiation indicates a circulatory blockage.

A further development beyond the scanner was the scintillation camera. The scintillation camera includes a large scintillation crystal proximate to which an array of photodetectors are positioned. Rather than moving from one point to the next, as does the scanner, the scintillation camera is able to view an entire field of view and is able to determine the location of incident gamma rays in the crystal by ascertaining the intensity with which the resulting flash of light is received by the various photodetectors in the array.

Scintillation cameras have also been used in a scanning mode to scan large areas of the body of a patient. Such scanning is typically carried out with a translating converging collimator. Scintillation cameras have also been used with slant-hole collimators. In such a utilization the scintillation camera is rotated in an orbit about an axis essentially perpendicular to the surface of the patient's body and focused on a plane beneath the surface of the patient's body. The use of scintillation cameras in either of the foregoing ways is referred as emission tomography imaging.

A further development in scintillation detector imaging is the technique known as Single Photon Emission Computed Tomography (SPECT). According to this technique a scintillation camera is aligned on a radial axis essentially perpendicular to an imaginary line passing through the patient from head to foot. The camera is then rotated in orbit about this imaginary line and nuclear events are detected and processed as the scintillation camera is moved in this fashion. With each revolution of the camera about the imaginary line passing through the patient from head to foot, a set of contiguous images of transverse cross section of the patient's body is produced. Different sets of transverse sections or "slices" are obtained by positioning the camera longitudinally relative to the imaginary line and driving the camera in a revolution about the patient's body. A description of a simple Single Photon Emission Computer Tomography technique appears in my prior U.S. Pat. No. 4,057,726.

In order to calibrate and check the accuracy of nuclear imaging instruments, test structures, known in the field as phantoms, are utilized. Prior phantom designs have involved devices in which radioactive or "hot" sources are interspersed at known spacing intervals within surrounding non-radioactive or "cold" regions. One typical prior art phantom is a lucite plate phantom. In this test structure a plurality of flat, parallel, lucite plates are arranged in a container at spaced intervals from each other. The lucite plates are divided into several groups. The plates within each group are of equal thickness and are spaced from each other a uniform distance. The thickness of the plates and the spacing therebetween is different in each group. The interstitial volumes between the lucite plates contain a radioactive source, such as technetium 99 m.

Other prior nuclear imaging phantoms have been produced in forms which encase radioactive sources within a structure, the shape and gamma ray attenuation properties of which simulate a human organ or body. Such conventional test phantoms may employ concentrated radioactive sources which are imaged as "hot" spots or small non-radioactive structures within a homogeneous radioactive source which exhibit "cold" spots in the image produced.

While conventional prior art phantoms have been adequate for purposes of testing, calibrating and adjusting nuclear imaging devices which are stationary, which are scanned, or which are employed in emission tomography imaging, the test phantoms heretofore available have been unacceptable for these purposes in Single Photon Emission Computerized Tomography. Because the technique of SPECT imaging produces a much higher quality of image as contrasted with prior nuclear imaging devices and techniques, the test phantoms heretofore available produce images in which software errors, malfunctioning components and misadjustments are simply not ascertainable. Nevertheless, such conditions must be ascertained if SPECT imaging is to be utilized to its full capabilities as a tool of nuclear medicine.

SUMMARY OF THE INVENTION

The present invention is a phantom constructed for use as a testing device for nuclear imaging instruments. The phantom of the invention has several very important features. The phantom of the invention employs a closed case which contains a plurality of straight, parallel columns of uniform cross section. The columns are of equal orthogonal dimensions measured in a plane perpendicular to column alignment. The columns are spaced at uniform distances equal to twice the column diameter. The columns are located in a closely packed hexagonal array to achieve equal spacing of columns having a circular cross section.

Preferably, the case is hollow and the columns are formed by solid rods. With the rods in position in a matrix within the case, a liquid having different radioactive properties from the rods is poured into the case. That is, the liquid may be water having a small dosage of technetium 99 m therein and the rods may be constructed of a non-radioactive material. Alternatively, the rods can be radioactive and surrounded by a non-radioactive liquid.

The phantom of the invention also provides line sources which can be positioned in the phantom without removing the top cover plate of the phantom. This feature is achieved by providing the case with at least one access opening and with at least one straight, rigid capillary tube containing a radioactive source and sealed at both ends. A stabilizing means such as a well in the bottom of the case is located internally within the case opposite the access opening. The capillary tube is removeably insertable into the opening externally from the case to extend through the cavity defined within the case. The capillary tube is laterally immobilized by the stabilizing means at one end and by a closure cap at the other. Preferably, the case is of a cylindrical, drum-shape and an access opening is provided at one end of the case along the cylindrical access. Preferably, also, another access opening and stabilizing means are provided to allow insertion of another capillary tube parallel to the axially aligned capillary tube and in spaced displacement therefrom. The use of such capillary tubes containing linear radioactive sources allows images of both on-axis and off-axis line sources to be produced from a SPECT imaging system.

The phantom of the invention may be used to calibrate, adjust and detect inaccuracies in virtually any commercially available type of nuclear imaging instrument or device. Because of its unique design, the phantom of the invention can be used for this purpose with SPECT imaging systems where conventional phantoms are inadequate. Furthermore, the phantom according to the invention is quite useful in analyzing image reconstruction in positron emission computerized tomography. Positron emission differs from slngle photon emission in that with the occurrence of a positron event two gamma rays are emitted in directions 180° apart. In positron emission computerized tomography two scintillation cameras or scintillation detectors are located 180° apart on either side of the patient, diametrically opposite each other from an imaginary line passing from head to foot through the patient. The two cameras are rotated together and maintained 180° apart as they revolve about the imaginary line. Each of the two cameras will then receive in coincidence one of the two gamma rays emanating from a radioactive source at the site of a nuclear event.

The invention may be described with greater clarity and particularity by reference to the accompanying drawings.

DESCRIPTION OF THE DRAWINGS

FIG. 1 is a sectional elevational view of a preferred embodiment of the invention.

FIG. 2 is a sectional detail indicated at 2 in FIG. 1.

FIG. 3 is a sectional plan view upward taken along the lines 3—3 of FIG. 1.

FIG. 8 is an elevational detail in isolation of one of the bolts for stabilizing the rod carrier of the invention.

FIG. 9 is a top plan view of FIG. 8

DESCRIPTION OF THE EMBODIMENT

Figure 7:
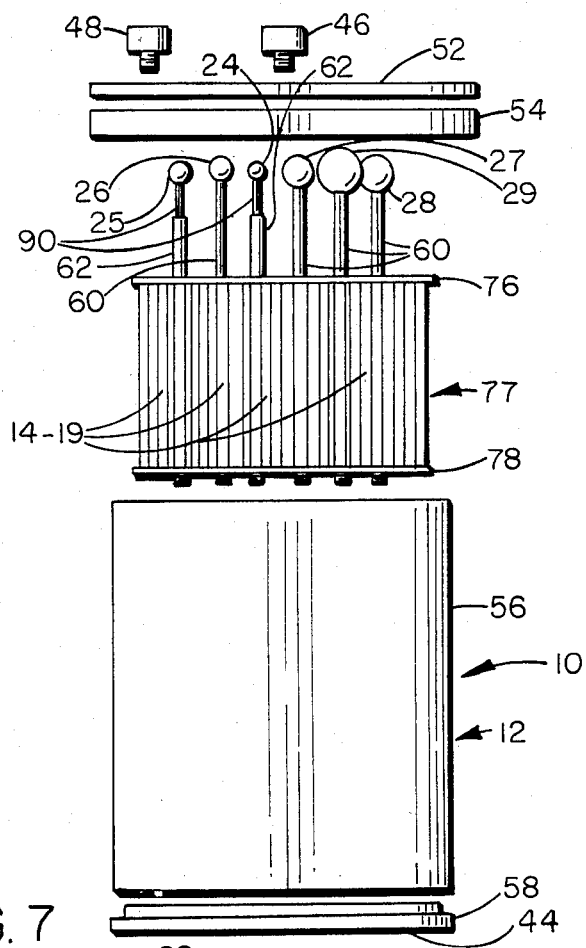
FIG. 7 is an exploded elevational view depicting assembly of the phantom of the invention.
Figure 4:
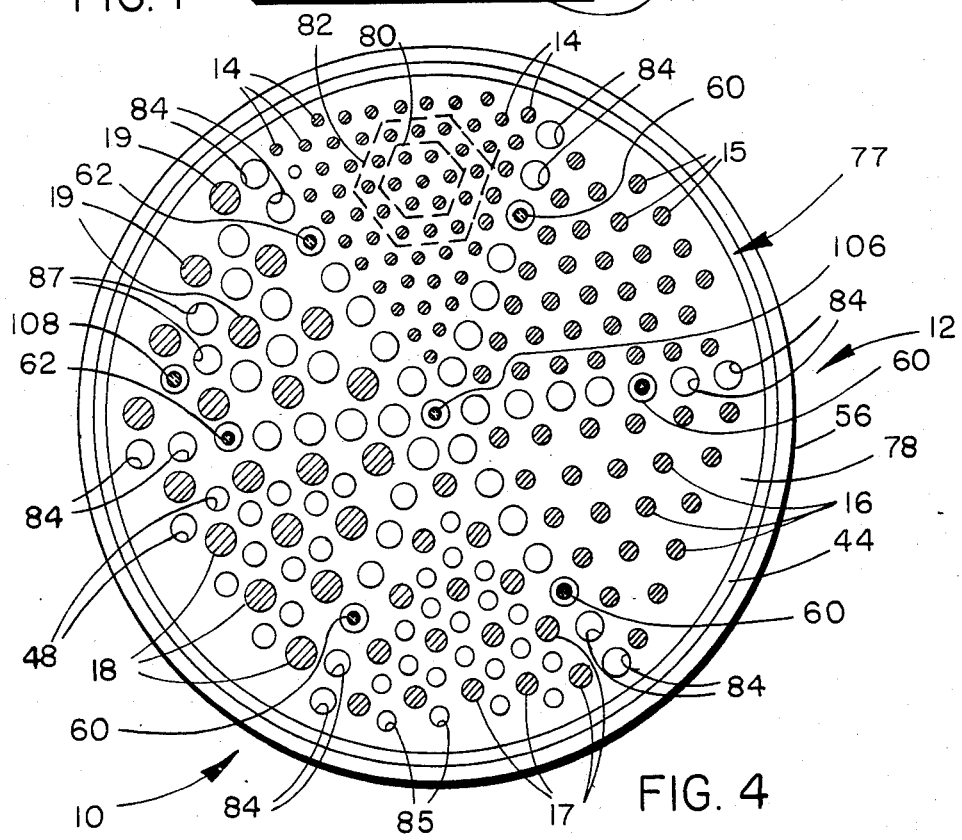
FIG. 4 is a sectional plan view downward taken along the lines 4—4 in FIG. 1.

A phantom 10 is illustrated in FIGS. 1 and 7. The phantom 10 includes a closed case 12 containing a plurality of straight, parallel columns in the form of a plurality of sets of rods 14–19. The rods in each set are of uniform cross section and are arranged in an array with uniform spacing therebetween, as depicted in FIG. 4. FIG. 4 is a plan sectional view in a plane perpendicular to a rod or column alignment. As illustrated in FIG. 4. the rods 14–19, in their respective sets, have equal orthogonal dimensions.

In addition to the rods, the phantom 10 includes a plurality of solid spheres 24–29 arranged in a common plane illustrated in FIG. 3, oriented perpendicular to the alignment of the rods 14–19. The spheres 24–29 lie in the plane of FIG. 3 in longitudinal displacement from the rods 14–19.

Figure 6:
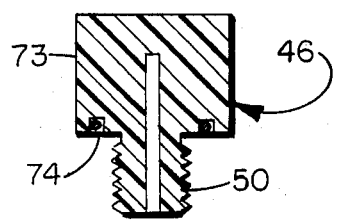
FIG. 6 is a sectional elevational view taken along the lines 6—6 of FIG. 5.

The phantom 10 also includes line sources in the form of narrow, straight, rigid capillary tubes 36 and 38. depicted in FIGS. 1 and 3. The capillary tubes 36 and 38 are removeably insertable into and out of engagement with longitudinal stabilizing wells 37 and 39, defined in the heads 41 of stabilizing bolts 106 and 108 which support a rod insert carrier 77. The bolts 106 and 108 screw into the bottom plate 44 and the capillary tubes 36 and 38 extend only to the top of the rod support carrier 77, as illustrated in FIG. 1. The capillary tubes 36 and 38 are accessible from outside the case 12 by removal of the closure caps 46 and 48. The closure caps 46 and 48 have downwardly projecting exteriorally threaded annular nipples 50, as illustrated in FIG. 6. The nipples 50 fit over the tops of the capillary tubes 36 and 38. The capillary tubes 36 and 38 are axially centered within the nipples 50 and are positioned within their respective closure caps 46 and 48. The capillary tubes 36 and 38 fit loosely within the access openings in the top cover plate 52 and extend slightly above the top cover plate 52. The capillary tubes 36 and 38 can easily be gripped using ones fingers and can be removed and replaced. The capillary tubes are simple, disposable glass tubes, sealed at both ends.

The capillary tubes 36 and 38 may be removed from the case 12 by threadably disengaging the closure caps 46 and 48 from the top cover plate 52 and withdrawing the capillary tubes 36 and 38 which extend slightly above the top cover plate 52 from the case 12. The access openings left in the top cover plate 52 are then normally closed by means of the closure caps 46 and 48, illustrated in FIG. 6. The closure caps 46 and 48 seal the access openings with or without a capillary tube therein.

As illustrated in FIG. 7, the case 12 is formed of a disc shaped top cover plate 52, an annular top support ring 54, a drum-like, cylindrical body 56, and a disc shaped bottom plate 44. The bottom plate 44 is a one-half inch thick disc of lucite at the base of which there is a radially extending annular base flange 58 3/32 of an inch in thickness. The periphery of the base flange 58 is four and three-eighths inches from the axial center of the case 12, while the portion of the bottom plate 44 fitting into the sleeve-like body 12 has a radius of 4.24 inches from the axial center of the case 12. Tapped wells are defined in the upper surface of the bottom plate 44 to receive thin, cylindrical rod-like mounting posts 60 and 62 upon which the spheres 24–29 are mounted, as depicted in FIGS. 1 and 7. The tapped wells in the upper surface of the bottom plate 44 are equally spaced at 60° intervals and at a distance of two and one-quarter inches from the axial center of the case 12. The tapped wells are sized to receive the one-quarter inch diameter externally threaded posts 60 and 62, and extend to a depth of three-eighths of an inch. The tapped wells do not extend entirely through the structure of the bottom plate 44. The bottom plate 44 also includes tapped wells 40 and 42 which are one-sixteenth of an inch in diameter and three-eighths of an inch deep. The wells 40 and 42 receive the threaded ends of the carrier stabilizing bolts 106 and 108, illustrated in FIGS. 8 and 9.

A sleeve-like body 56 of the case 12 is constructed of lucite and has an inner diameter of eight and one-half inches and an outer diameter of eight and three-quarter inches. The sleeve-like body 56 is seven and nine-sixteenths inches in height and is glued to the bottom plate 44 at the flange 58.

The top support ring 54 is glued to the upper edge of the sleeve-like body 56. The top support ring 54 has a cross sectional configuration, as depicted in FIG. 2, and includes a radially inwardly extending annular flange 66 which resides in abutment against the upper edge of the sleeve-like body 56. The outer diameter of the top support ring is 10.2 inches, and the top support ring 54 is bored and tapped at twelve equally spaced locations 70. An annular O-ring 68 encompassing an area nine inches in diameter resides in an annular channel defined in the upper surface of the top support ring 54.

The disc shaped top cover plate 52 is constructed of lucite one-half inch in thickness. Twelve equally spaced holes are drilled through the top cover plate 52 in alignment with the corresponding tapped holes 70 in the top support ring 54. Twelve screws 72 fasten the top cover plate 52 to the top support ring 54, thereby forming a hollow, cylindrical enclosure or cavity within the case 12. The O-ring 68 forms a liquid tight seal, as do the O-rings 74 residing in annular channels in the undersides of the closure caps 46 and 48.

Figure 5:
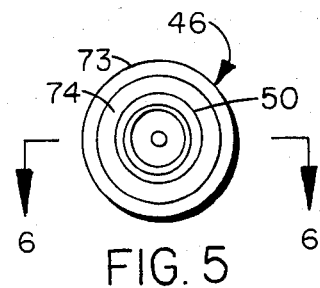
FIG. 5 is a plan view of the bottom of the closure cap removed from the phantom case.

The closure caps 46 and 48 are preferably constructed of delrin. One closure cap 46 is depicted in isolation in FIGS. 5 and 6. The closure caps 46 and 48 have upper enlarged heads 73, knurled around their peripheral surfaces. Narrower, threaded nipples 50 extend downwardly from the cap heads 73. The threaded nipples 50 in the closure caps 46 and 48 are engageable in 7/16 inch diameter threaded access openings defined through the structure of the top cover plate 52. One of the access openings is located at the axial center of the top cover plate 52 while another access opening is located three and three-eighths inches in radial displacement therefrom. The case 12 thereby defines a hollow, completely enclosed liquid tight cavity therewithin having access openings plugged by closure caps 46 and 48.

As illustrated in FIG. 4, the rods 14–19 are all solid rods of circular cross section and cylindrical configuration. The rods are all held together in a fixed matrix by disc shaped interconnecting upper and lower lucite carrier plates 76 and 78, respectively, depicted in FIGS. 1 and 7. The interconnecting carrier plates 76 and 78 are drilled with congruent holes in template as illustrated in FIG. 4. As illustrated in FIG. 4, all of the rods 14–19 extend through some of the holes drilled in the interconnecting carrier plates 76 and 78 and are glued thereto. The carrier plates 76 and 78 thereby lock the rods in spaced relationship to each other. The rods 14–19, together with the interconnecting top and bottom carrier plates 76 and 78, define a carrier 77, which is removeable as a unit from the case 12, as depicted in FIG. 7.

Additional holes 84, 85, 87 are defined in the transversely oriented carrier plates 76 and 78 to allow the free circulation of a liquid containing a radioactive dose within the cavity encompassed by the case 12. Also, the sphere mounting posts 60 and 62, as well as the carrier stabilizing support bolts 106 and 108 pass through other of the openings in the carrier plates 76 and 78 at the locations depicted in FIG. 4.

As illustrated in FIG. 4, the rods 14–19 are arranged in proximity to each other in separate sets. The rods in each set are of equal cross section to each other and are uniformly spaced proximate to each other at a distance equal to twice the rod diameter. The cylindrical rods 14 have a diameter of 0.188 inches and are spaced from each other, a center to center distance of 0.376 inches. Similarly, the rods 15 have a diameter of 0.250 inches and are spaced from each other a center to center distance of 0.500 inches. Rods 16 are of a 0.312 inch diameter and are spaced from each other a center to center distance of 0.625 inches. The rods 17 have a diameter of 0.375 inches and are spaced from each other a distance of 0.750 inches. The rods 18 have a diameter of 0.437 inches and are spaced a distance of 0.875 of an inch apart, center to center. The rods 19 are 0.500 inches in diameter and are spaced apart a distance of one inch.

Rods in each of the sets are arranged in a hexagonal array about at least one other of the rods in the same set. That is, for example, the rods 14 define a hexagonal array with six of the rods 14 being arranged at equal distances from each other and from the rod surrounded thereby. An inner hexagonal array is indicated at 80 in FIG. 4 and a surrounding hexagonal array is indicated at 82. A close inspection of each of the other sets of rods 15, 16, 17, 18 and 19 would likewise reveal one or more concentric rings of a hexagonal array with at least six rods in each set being spaced equally about another rod in that set and at an equal distance therefrom.

The diameters of the remaining apertures of the openings in the interconnecting plates 76 and 78 is as follows:
Openings 84—⅜ inches in diameter;
Openings 85—5/16 inches in diameter; and
Openings 87—7/16 inches in diameter.

The diameters and the spacings of the rods 14–19 are extremely important, as they define patterns of radioactivity which are sufficiently precise to allow state of the art SPECT imaging systems to be evaluated and adjusted. Conventional nuclear imaging phantoms are not adequate for this purpose.

The spheres 24–29 are mounted on posts 60 and 62, as depicted in FIGS. 1, 3 and 7. The spheres 24–29 are releaseably secured to the bottom plate 44 of the case 12 by means of the posts 60 and 62. The posts 60 and 62 are ¼ inch in diameter and are threaded at their lower extremities. The posts 60 and 62 thereby screw into tapped wells defined in the bottom plate 44. By adjusting the degree of threaded engagement of the posts 60 and 62 in the tapped wells in the bottom plate 44, the height of the spheres 24–29 above the bottom plate 44 can be separately adjusted. By longitudinally and separately adjusting the position of each of these spheres 24–29, it is possible to ensure that each of the spheres is positioned in a common plane oriented perpendicular to the alignment of the rods 14–19, and in longitudinal displacement from the rods. As illustrated in FIGS. 1 and 3, a common horizontal plane passes through the centers of all of the spheres 24–29. The plane of FIG. 3 lies above all of the rods 14–19.

A longitudinal bore is defined in each of the spheres 24–29 for purposes of mounting the spheres upon the posts. The spheres 26, 27, 28 and 29 are all glued to the upper extremity of an associated post 60. Because the spheres 25 and 26 are of smaller diameter, they are glued to the tops of an associated ⅛ inch diameter post extension 90. The post extensions 90 are glued into axial bores in the upper ends of the posts 62.

The capillary tubes 36 and 38 are formed of lengths of very narrow glass tubing having an outer diameter of 1 millimeter and an inner diameter of 1/10 millimeter. In their manufacture, the tubes 36 and 38, open at both ends, are placed upright with their lower ends in contact with a liquid containing a radioactive isotope. By capillary action the liquid is drawn up into the tubes 36 and 38. Both ends of the capillary tubes 36 and 38 are then sealed so as to entrap the radioactive line source within the tubes. One end of each of the tubes 36 and 38 is then inserted through the top cover plate 52 through the access openings and into the wells 37 and 39 in the heads 41 of the carrier stabilizing bolts 106 and 108. The closure caps 46 and 48 are then placed so that the nipples 50 surround the ends of the capillary tubes 36 and 38 which extend above the top cover plate 52. The closure caps 46 and 48 are then screwed into the top cover plate 52. The O-rings 74 form a fluid tight seal between the closure caps 46 and 48 and the access openings in the top cover plate 52. The capillary tubes 36 and 38 are thereby entrapped, and both longitudinally and laterally restrained by the closure caps 46 and 48 and by the heads 41 of the bolts 106 and 108. As is evident from FIG. 1, the access openings defined in the top cover plate 52 are much larger than the cross sections of the capillary tubes 36 and 38 and are internally threaded to receive the nipples 50 of the closure caps 46 and 48 in threaded engagement therewith. By threadably disengaging the closure caps 46 and 48 from the top cover plate 52, the line sources within the capillary tubes 36 and 38 may be withdrawn without removing the top cover plate 52.

The phantom of the invention is a highly versatile device for testing nuclear imaging instruments. To use the phantom 10 the carrier 77 is inserted into the case 12 and the remaining volume of the case 12 is filled with a low level dosage of a radioisotope and water. For example, the case 12 may be loaded with 10 to 20 millicuries of technetium 99 m pertechnitate and the case 12 filled to the top with water. The radioactive liquid may be poured into the phantom 10 before insertion of the closure caps 46 and 48.

Revolution of a scintillation camera in a SPECT imaging system about the central, cylindrical axis of the case 12 in the plane in which FIG. 4 is taken will produce a circular image in which the rods 14–19 will appear as a pattern of "cold" spots. By examining the image produced to ascertain the degree to which the image conforms to the rod spacing depicted in FIG. 4 one can measure the degree to which irregularities in the image exist. Also, the image sensitivity can be ascertained by noting which of the sets of the rods 14–19 produce clear images. Nuclear imaging instruments with good resolution will produce discrete images of all of the sets of rods, including the set of the smallest rods 14. Where image quality is degraded, the images of the sets of rods will be smeared, with the images of the smallest rods 14 being first to produce a smeared image. Image resolution can be compared numerically in terms of the diameter and spacing of the rod sets which produce images of a good quality.

If the spheres 24–29 are in position as depicted in the drawing figures, the rods 60 and 62 will also produce images in the form of "cold" spots in a section at the plane of FIG. 4. However, since the rods 60 and 62 are threadably engagable in the bottom plate 44, the spheres 24–29 can be removed entirely so as not to disrupt the hexagonal array of "cold" spots which appear in the plane of FIG. 4.

The uniform cross section and equal orthogonal dimensions of the sets of rods 14–19 is of particular significance in testing SPECT imaging systems. Prior art systems employed bar patterns which emphasized spacing in one dimension only. However, because the scintillation detector in a SPECT imaging system rotates entirely around the object to be viewed, aberrations which appear in one dimension may not necessarily appear in an opposite, orthogonal dimension. However, with the structure of the phantom 10 irregularities in this regard are detectable with far greater accuracy than with prior art phantoms. It is therefore possible using the phantom 10 to sample a multitude of spatial frequencies.

The phantom 10 is also useful in testing the ability of a nuclear imaging instrument to detect point sources of non-radioactivity in a radioactive background. To this end, the spheres 24–29 are positioned as previously described. A SPECT imaging system can then be positioned longitudinally to produce an image of a plane at the plane of FIG. 3. The image produced can then be evaluated to determine the degree to which any "cold" spots present conform to the size and location of the spheres 24–29, as depicted in FIG. 3. Only the most sensitive nuclear imaging instruments will be able to detect the "cold" spots produced by the smallest sphere 24, while less sensitive nuclear imaging instruments will produce clear images only of the larger spheres, such as the spheres 29 and 28. Because spherical objects are utilized, it is also possible to ascertain the thickness of "slices" through the phantom 10 with longitudinal adjustment of the SPECT imaging system relative to the center, cylindrical axis of the case 12.

The phantom 10 is also useful for detecting both on-axis and off-axis line sources. With the capillary tubes 36 and 38 in position, as depicted in FIG. 1, the ability of a nuclear imaging instrument to detect and produce images of line sources can be ascertained. These line sources will appear as dots, corresponding to the central, liquid radioactive cores 36' and 38', depicted in FIG. 3. These radio active cores 36' and 38' will be surrounded by annular "cold" rings, corresponding to the wall thickness of the capillary tubes 36 and 38. Only the most sensitive nuclear imaging instruments are able to produce accurate images of line sources of this type. Moreover, by imaging line sources both on the phantom axis, such as with the line source 36', and off the phantom axis, as with the line source 38', inaccuracies in the software which might affect the image position of the line source 38' relative to the line source 36' can be detected.

The capillary tubes 36 and 38 can be removed, along with the enclosure caps 46 and 48 secured thereto without removing the top cover plate 52. This is achieved by merely unscrewing the closure caps 46 and 48 and withdrawing the capillary tubes 36 and 38 from the laterally stabilizing wells 37 and 39 in the rod assembly support rods 106 and 108. Closure caps 46 and 48 without capillary tubes, depicted in FIG. 6, can then be threadably engaged in the access openings from which the capillary tubes 36 and 38 were removed. As previously noted, the O-rings 74 form a liquid tight seal completely enclosing the radioactive liquid within the phantom 10 whether the capillary tubes 36 and 38 are present or absent.

With the capillary tubes 36 and 38 removed, a SPECT imaging system can be longitudinally positioned to produce an image of the phantom 10 above the plane of FIG. 3 and below the top cover plate 52. If the image of the SPECT imaging system is of high quality, the image produced will be uniform, indicating a homogeneous distribution of radioactivity throughout the cross section of the case 12. Any departures from such an image will indicate non-uniformity in the nuclear imaging instrument tested. The capillary tubes 36 and 38 can be replaced by merely removing the empty closure caps 46 and replacing the closure caps 46 and 48 bearing the capillary tubes 36 and 38, as indicated in FIG. 1. The access openings in the top cover plate 52 which receive the nipples 50 are considerably larger than the cross section of the capillary tubes 36 and 38. The capillary tubes 36 and 38 are lowered through these openings through the cavity within the case 12 until they reach the stabilizing wells 37 and 39 in heads 41 of the rod assembly supporting bolts 106 and 108. The ends of the capillary tubes 36 and 38 are thereupon laterally stabilized as the nipples 50 of the closure caps 46 and 48 are screwed into the access openings in the top cover plate 52.

Undoubtedly, numerous variations and modifications to the phantom of the invention are possible. While the embodiment 10 has been constructed with solid, non-radioactive rods which function as non-radioactive columns in the surrounding radioactive liquid, a reverse construction is possible. That is, a solid, non-radioactive structure could be drilled with columnar openings or wells of uniform cross section in equal orthogonal dimensions in a plane perpendicular to column alignment. The columnar wells could be arranged in an array with uniform spacing therebetween and filled with a radioactive fluid. Thus, the images of the array of columns would appear as "hot spots" rather than as "cold spots" as in the embodiment depicted in the drawings. Numerous other modifications to the invention are also possible. Accordingly, the invention should not be considered as limited to the specific embodiment depicted in the drawings, but rather is defined in the claims appended hereto.

I claim:

1. A nuclear imaging phantom comprising a case encompassing a cavity and having at least one access opening therein to said cavity and having internally located stabilizing means remote from said access opening, and at least one straight, rigid, capillary tube is removeably insertable into said opening externally from said case to extend into said cavity to said stabilizing means.

2. A nuclear imaging phantom according to claim 1 wherein said opening is larger than the cross section of said capillary tube, and further comprising closure means secured to said capillary tube and removeably engageable in said opening in fluid tight relationship with said case when said capillary tube extends through said cavity to said stabilizing means.

3. A nuclear imaging phantom according to claim 2 wherein said closure means is threadably engageable with said case at said opening.

4. A nuclear imaging test device comprising a hollow structure, having internal stabilizing means, and at least one straight, rigid, capillary tube removeably insertable into said hollow structure into and out of engagement with said stabilizing means.

5. A nuclear imaging test device according to claim 4 in which said structure is of cylindrical shape and further comprising a plurality of said capillary tubes and said structure is adapted to receive one of said capillary tubes along its axis and another of said capillary tubes displaced from its axis and parallel thereto.

6. A nuclear imaging test device according to claim 4 in which said capillary tube contains a linear, radioactive source and is sealed at both ends.

* * * * *